July 28, 1942.  G. C. GEORGE  2,291,546
PRECOOLING DEVICE FOR REFRIGERATOR CARS
Filed July 26, 1940  3 Sheets-Sheet 1
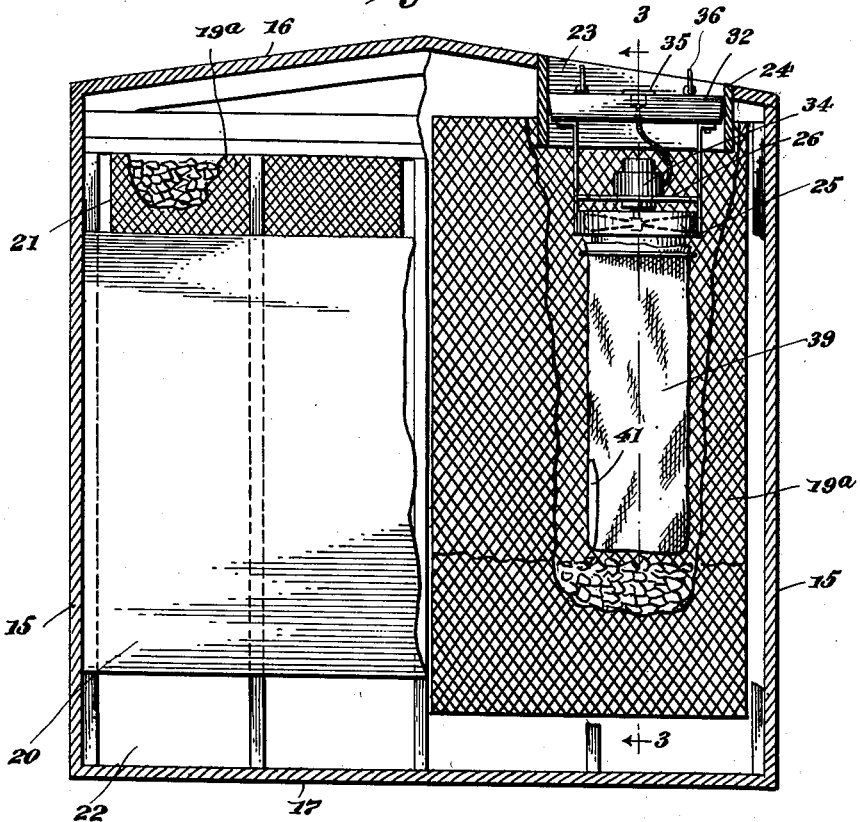
Inventor
GLENN C. GEORGE
By
Attorney July 28, 1942.　　　G. C. GEORGE　　　2,291,546
PRECOOLING DEVICE FOR REFRIGERATOR CARS
Filed July 26, 1940　　　3 Sheets-Sheet 2
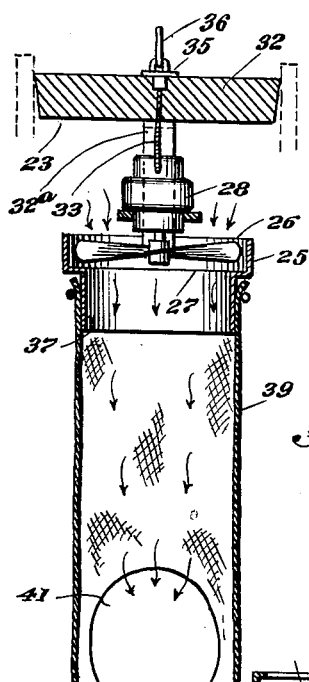
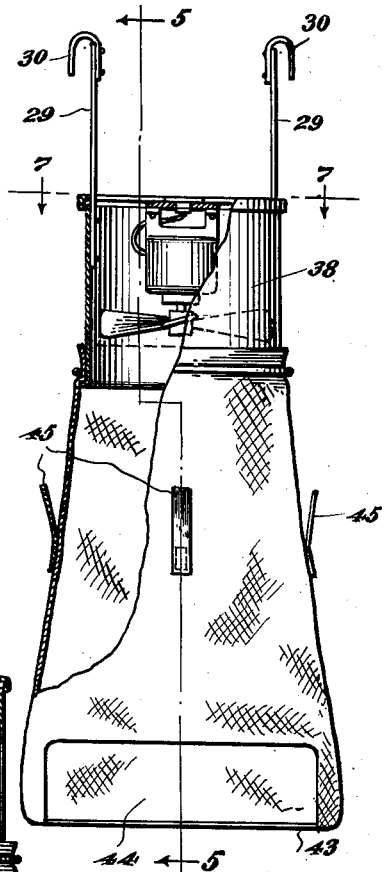
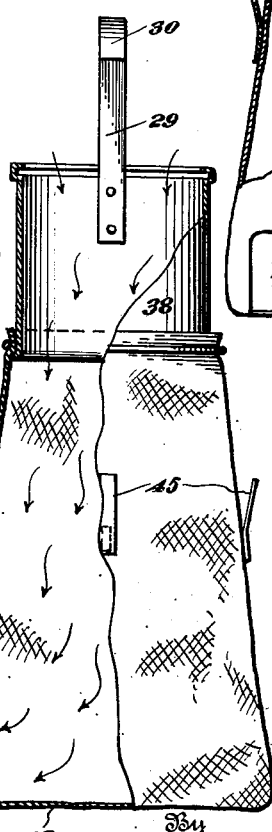
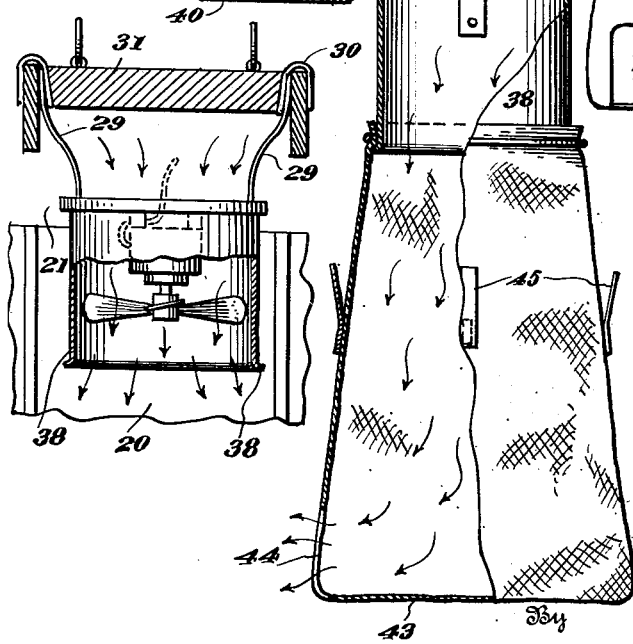
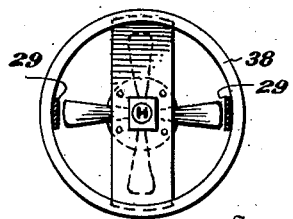
Inventor
GLENN C. GEORGE July 28, 1942.    G. C. GEORGE    2,291,546
PRECOOLING DEVICE FOR REFRIGERATOR CARS
Filed July 26, 1940    3 Sheets-Sheet 3
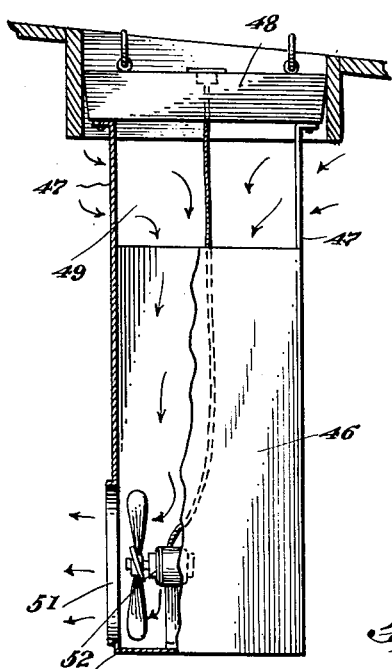
Fig. 8.
Fig. 9.
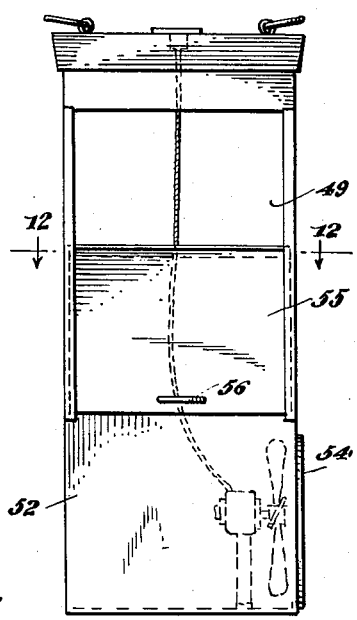
Fig. 10.
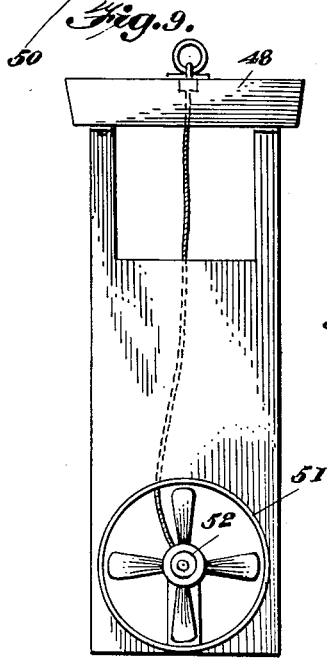
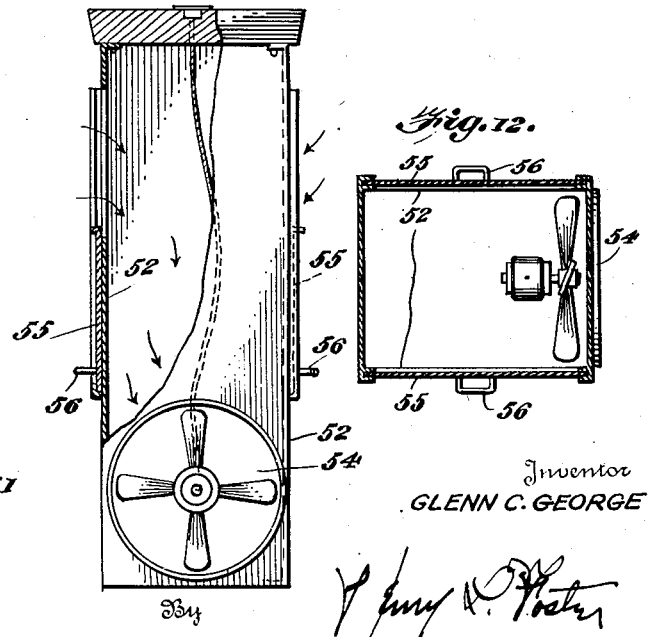
Fig. 11.
Fig. 12.
Inventor
GLENN C. GEORGE
By
Attorney Patented July 28, 1942

2,291,546

UNITED STATES PATENT OFFICE 2,291,546

PRECOOLING DEVICE FOR REFRIGERATOR CARS

Glenn C. George, Omaha, Nebr.

Application July 26, 1940, Serial No. 347,738

11 Claims. (Cl. 62—19)

The present invention relates to precooling devices for refrigerator cars of the type having ice bunkers, usually at opposite ends of the cargo space. Such bunkers are normally enclosed, and set off from the cargo space by vertical bulkheads so constructed as to provide inlet spaces adjacent the ceilings of the cars and outlet spaces adjacent the floors. In use, the warm air at the ceiling of the car flows through the inlets at the ceiling, down through the charged bunker, and from the bunker back to the cargo space by way of the outlets adjacent the floor. Such cars are provided with hatches in their roofs, overlying the bunkers, and by means of which the bunkers are charged with ice. These hatches have closures that engage within coaming structures to close the hatch openings, such closures being known as "plugs."

The advantages of precooling refrigerator cars are so well known as to require no discussion here. This invention is directed to the provision of a power-operated precooling device that moves air through the ice bunkers of a car, and which is so arranged as to provide superior results over heretofore known devices of the same general type. These superior results are achieved by reason of novel principles and structural arrangements employed and embodied in the devices herein disclosed.

One object of the invention is the provision in a precooling device including a fan means for insuring a circulation of air from the cargo space through the ice bunker and back to the cargo space, novel means being included for overcoming the tendency of the air to circulate only partially through the ice bunker and to return to the cargo space by the same passage through which it entered.

Another object is the provision of a novel portable precooling device, which will be efficient in operation, inexpensive to manufacture and maintain, and which will be readily handled and operated.

Another object is the provision in a portable precooling device of novel supporting arrangements whereby the device may be inserted into an ice bunker of a refrigerator car and therein supported below the hatch, while permitting that the hatch be tightly shunt.

Still another object is the provision in a portable precooling device of novel supporting means that are adjustable to cars of various hatch arrangements and dimensions, and that permit the use of the plug with which the cars are furnished to close the hatchway while the device is in operation.

A further object is the provision in a portable precooling device of novel means for directing air through an ice bunker in such fashion as to provide for the most efficient cooling of such air.

A still further object is the provision of a novel air duct that is collapsible to permit the precooling device with which it is assembled to be readily handled, both in being carried, and in being mounted and dismounted on cars.

In the accompanying drawings:

Figure 1 is a broken elevation of a car, showing one end provided with ice bunkers inside of which baskets are positioned for holding ice, one form of precooling device embodying the invention mounted in operating position within the bunker.

Figure 2 is a broken plan view of the end portion of a refrigerator car with a precooling device mounted therein.

Figure 3 is a sectional view on line 3—3 of Figure 1.

Figure 4 is an elevation of a modified form of the invention.

Figure 5 is a diagrammatic sectional elevation, showing the air flow through the device of Figure 4.

Figure 6 is a broken elevation of another embodiment of the invention, shown mounted in operative position.

Figure 7 is a sectional view on line 7—7 of Figure 4.

Figure 8 is a broken side elevation of another modification of the invention.

Figures 9 and 10 are respectively front and side elevations thereof.

Figure 11 is a broken front elevation.

Figure 12 is a sectional view on line 12—12 of Figure 10.

Describing the drawings more particularly, the numeral 15 indicates the side walls of a refrigerator car having a roof 16, a floor 17 and end walls 18. Ice bunkers, designated generally 19, within which are positioned ice-holding baskets 19a, are set off at the ends of the car from the cargo space by bulkheads 20 that are so arranged with relation to the roof 16 and floor 17 as to leave air inlets 21 adjacent the ceiling of the car and air outlets 22 adjacent the floor. Filling hatches comprising openings 23 extend through the roof over the ice bunkers 19, and are surrounded by coamings 24.

The precooling devices of this invention comprise assembly with a motor-driven fan of a duct for conducting the air moved by the fan to such a point that it will not be drawn back to the rear of the fan, but will be forced to pass completely through the bunker in a vertical direction and out of the bunker to the cargo space.

Referring to Figures 1 to 3, the precooling device therein illustrated includes a fan casing 25 having an air inlet 26 and an outlet 27, and a motor-operated fan 28 arranged to move air from the inlet to the outlet. In use, the fan casing, in which the fan is supported, is maintained in vertical disposition with the inlet 26 uppermost, within an ice bunker 19 and below the filling hatch 23, which affords passage for the introduction and withdrawal of the device. When in position for operation, the casing is so located with respect to the bulkhead 20 that the inlet 26 is spaced below the level of the car ceiling, so that air is withdrawn from adjacent the ceiling to the inlet. Preferably, when the device is so mounted, the inlet is arranged at a level between the top edge of the bulkhead 20, so that air is withdrawn from the cargo space by way of the inlet 21 to the bunker, and directly to the inlet 26 of the casing 25.

The fan casing may be supported in a variety of ways, but the most advantageous are such that ready mounting and dismounting may be accomplished, preferably without the necessity of special permanent fittings attached to the structure of the car.

The preferred supporting structure is illustrated in Figures 4 to 7, and comprises a pair of straps 29 secured to the fan casing and extending axially thereof beyond the inlet 26 to such a distance as will properly position the inlet 26 when the straps are secured to the car structure. Such fixing is accomplished in a highly desirable way by hooks 30 at the ends of the straps 29, arranged to be engaged over the coaming 24 of the hatch structure on opposite sides of the opening. The straps are sufficiently flexible to permit lateral movement of the hooks 30 so that the straps may be hooked to hatch structures of various sizes. The straps 29 are sufficiently thin, in directions at right angles to the surfaces of the coamings over which the hooks 30 are placed as to permit them to extend between the inner surfaces of the coaming 24 and the hatch plug 31 with which the particular hatch is provided and which normally closes that hatch. This permits each hatchway to be closed during precooling by its own plug, obviating the necessity for specialized plugs, or plugs not specially fitted to the individual hatches. Advantageously the straps 29 are heavy canvas, since the use of a flexible fabric permits them to be folded or rolled and put inside the casing 25 when the device is dismounted, the hooks 30 being rigid material as metal. Other materials as sheet metal may obviously be used if desired.

Another form of support is shown in Figures 1 to 3, and consists of a plug 32 from which depend arms 32a which are attached to and arranged for supporting the fan casing 25 in proper position. An electric cable 33 is connected with the fan motor and a receptacle 35 mounted in the plug 32, and into which an electric supply cable may be plugged. A certain amount of collapse is permitted if the arms 32a are in the form of flexible straps.

The air is delivered in a vertical downward direction from the outlet 27 of the fan casing 25, and in order to insure that the air will pass through the bunker 19 and out of it to the cargo space by way of the bottom outlets 22, and to prevent the setting up of return currents from the casing outlet 27 to the inlet 26, a duct is arranged to receive the air discharged from the outlet 27 and to conduct it to such a point that it will be forced through the bunker rather than returning.

This duct may consist of a depending skirt, as 37, Figure 3, surrounding the outlet 27 of the fan casing 25, or it may constitute merely an extension of a tubular fan casing 38, as shown in Figure 6. The essential feature of the arrangement of the duct is that it be so related to the inlet of the fan casing as to guard against the creation of a circulatory flow of air within the bunker.

While a duct of the limited extent shown in Figure 6 is desirable, and will produce good results, much superior to the use of an unguarded fan within an ice bunker, or a discharge of air into a bunker through the passage spaces at top or bottom, a duct arrangement of much superior qualities both from an airflow and a cooling standpoint may be provided. To this end a flexible fabric boot of specialized form may be employed. Such a boot is shown at 39 in Figures 1 and 3, such boot 39 being in the form of a cylindrical structure secured about the depending flange of the fan casing 37. The boot 39, the wall of which advantageously is canvas, has its discharge end closed by an end wall 40, adjacent which is a laterally directed outlet 41. When such an assembly is introduced into an ice bunker filled with ice, the wall 40 will rest on the top surface of the ice with the discharge end so positioned with relation to the surface of the ice that the lateral outlet 41 will not only provide for free egress of air from the duct, which, were the outlet in the end of the duct, might be blocked by the engagement of the end upon the surface of the ice, but it also serves to direct the emerging stream of air into close contact with the ice in the bunkers. The air stream flows over the top surface of the ice in the bunker in which the precooling device is mounted, and, in the type of car illustrated, wherein the bunkers are provided with baskets 19a, the air stream is directed against the side of the column of ice in the adjoining bunker. The air flows downwardly through the bunkers to the outlets 22, since the air inlet 26 of the precooling device is so arranged as to draw air through the inlets 21, rather than from the interiors of the bunkers, thus setting up a circulating flow that tends to assist in causing the discharged air stream in flowing to the outlets 22.

In Figures 4 and 5, the boot 42 is bell-shaped, the discharge end being materially larger than the intake end that is secured to the fan casing, the discharge end being closed by an end wall 43, and having adjacent such wall a lateral outlet 44. The advantage of the bell-shaped boot 42 is that it may be collapsed telescopically about itself, and the lower portion may be drawn up about the fan casing 38. When so collapsed, the units present a very compact and readily handled structure. It also provides a structure that readily becomes extended when, after being inserted into a charged bunker with the end wall 43 supported on the top of the ice, the level of the top of the ice descends during melting. Straps 45 may be secured to the wall of the boot to afford a readily grasped means of drawing it up to collapse it when it is to be withdrawn from a bunker.

The closing of the flexible boots, in either form described above has a valuable effect in that they tend to become inflated by the air driven into them by the fans. This inflation tends to maintain the lower portions, or discharge ends, of the ducts in proper relation to the surface of the ice with which they are in contact that the lateral discharge openings are maintained in correct position to discharge the air streams over the surfaces of the ice, as described above.

The inflation of the boots also has a helpful effect in keeping the bottoms of the boots in close contact with the surface of the ice, so that the air streams are maintained in direct contact with the surface of the ice.

In the form of invention illustrated in Figures 8 to 12, the duct comprises rigid side walls 46 secured by straps 47 to a plug 48, the walls being spaced below the under surface of the plug sufficiently to provide air inlet openings 49 to the interior of the duct. The duct is provided at its lower or discharge end with an end wall 50, adjacent which is an outlet 51 in one of the side walls 46. A motor-operated fan 52 is mounted on the end wall 50, within the duct, facing the outlet 51, and arranged to force air through the outlet from the interior of the duct.

In Figures 10 to 12, the two opposite side walls 52 that are in angular relation to that wall 53 having the outlet 54, are provided with sliding doors 55, that may be opened, as shown in Figures 10 and 11, to give access to the fan. Handles 56 are mounted on such doors to enable them to be operated.

It will be seen that the structures herein described provide for efficient circulation of air between the cargo space and ice bunkers within which they are mounted, and force the air to pass completely through the bunkers. They are superior to permanently mounted devices because they occupy no cargo space and permit precooling of a full cargo loaded within a refrigerator car, because they occupy no bunker space when the bunkers are charged for hauling, and, perhaps most important, they do not necessitate the permanent equipment of each car with a number of devices since a battery may be maintained at precooling points for use on successive cars. They are compact and readily handled, are readily mounted and dismounted without the necessity of manipulating fastening or suspension devices, are so arranged as to be operated in the ice bunkers and so provide for direction of the air directly upon the ice within such bunkers, require no special fittings or car structure, and do not necessitate the attachment of any supporting elements to the cars. The devices are also inexpensive, both in first cost and maintenance, and in operation, and their ready removal permits icing to be accomplished immediately after precooling has been finished.

It is thought that from the foregoing the construction, operation and many advantages will be apparent to those skilled in the art, and it will be understood that changes in the size, shape, proportions and minor details may be resorted to without departing from the spirit of the invention as set forth in the accompanying claims.

I claim:

1. A precooling device for refrigerator cars having ice bunkers separated from their cargo spaces by vertical bulkheads providing inlets to the bunkers at their tops and outlets to the cargo spaces at their bottoms, and filling hatches above the bunkers; said device comprising a tubular air duct having intake and discharge ends, means for removably positioning said duct entirely within an ice bunker below a hatch closure closing the hatch of a car with the intake end of said duct uppermost and spaced below the hatch closure and with the discharge end of said duct within the bunker and spaced below the lower edge of the top inlet opening into the bunker, and a power-driven fan arranged to move air through the duct from its intake end to its discharge end.

2. A precooling device according to claim 1, wherein the means for supporting the duct comprise straps secured to the duct and extending axially thereof beyond its intake end, and rigid hooks mounted on the free ends of said straps, said hooks being arranged to hook over the structure surrounding the hatchway of a refrigerator car, and the straps being arranged to extend between the closure of a hatchway and the structure surrounding the hatchway when the device is so mounted and the hatch closure applied to the hatchway.

3. A precooling device according to claim 1, wherein the means for supporting the duct comprise straps secured to the duct and extending axially thereof beyond its intake end, and hooks mounted on the free ends of said straps, said hooks being arranged to hook over the structure surrounding the hatchway of a refrigerator car, the straps being arranged to extend between the closure of a hatchway structure and the structure surrounding the hatchway when the device is so mounted and the hatch closure applied to the hatchway, said straps being sufficiently flexible to permit lateral movement of the hooks to afford adjustment for hatchways of different sizes.

4. In a precooling device for refrigerator cars, said device being adapted for mounting within the ice bunker of a car, and including a motor-driven fan; an air-delivery duct assembled with the fan and arranged to conduct air propelled by the fan to a point within the bunker and spaced below its upper air-passing opening, said duct being arranged to deliver such air in a direction that extends transversely to the duct and substantially horizontally.

5. In a precooling device for mounting in an ice bunker of a refrigerator car, and including a motor-operated fan; an air-delivery duct assembled with the fan for conducting air propelled thereby, said duct having an intake end and a discharge end, means for supporting the duct with its inlet end adjacent the ceiling of the car but spaced below it and its delivery end within the ice bunker below the intake end, said delivery end being provided with an end wall and a lateral outlet adjacent said end wall.

6. An air duct according to claim 4, comprising a tubular structure having flexible walls.

7. An air duct according to claim 5, comprising a tubular structure having flexible walls.

8. An air duct according to claim 5, comprising a bell-shaped tubular structure having flexible side walls that taper outwardly towards the discharge end, whereby said duct may be telescopically collapsed.

9. A precooling device for removable mounting in an ice bunker of a refrigerator car, said device comprising a fan casing having an air inlet and an outlet, means for supporting said casing within the dimensions of an ice bunker of a refrigerator car with its inlet adjacent the ceiling of the car and spaced below it to provide for entry of air to the inlet of the casing, and a duct comprising an axially collapsible tubular structure having an intake end secured to the fan casing about the outlet and a discharge end, an end wall closing the discharge end, said discharge end being adapted to rest upon ice in the ice bunker and thereby maintain the duct in collapsed position when the top of the ice is sufficiently high, and to move downwardly with the top of the ice during melting, thereby progressively extending the duct, said duct being provided adjacent the end wall with a lateral outlet for discharging air over the surface of the ice upon which the discharge end rests.

10. A precooling device according to claim 9, wherein the outlet of the fan casing is tubular, the supporting means are arranged to position the fan casing in vertical disposition, and the duct comprises a bell-shaped boot having flexible walls that taper outwardly towards the discharge end, the intake end of the duct being secured about the tubular outlet of the fan casing, whereby the duct may be axially collapsed about itself and about the tubular outlet of the fan casing.

11. In a refrigerator car, a precooling system comprising the combination with an ice bunker structure provided at its top with a warm air inlet communicating with the cargo space of the car and that openly extends transversely of the car a substantial portion of the width of the bunker, of an air circulating device positioned wholly within the ice bunker and comprising a duct having an intake that is arranged adjacent the open air inlet and extends transversely of the car a distance materially less than that of the said inlet, the said inlet of the bunker structure extending openly to either side of the said intake, and an outlet spaced below the said inlet, and means for moving air through the duct from the intake to the outlet.

GLENN C. GEORGE.